May 19, 1964
M. G. SPRAGUE
3,133,533
CIRCULAR SAW
Filed March 15, 1963
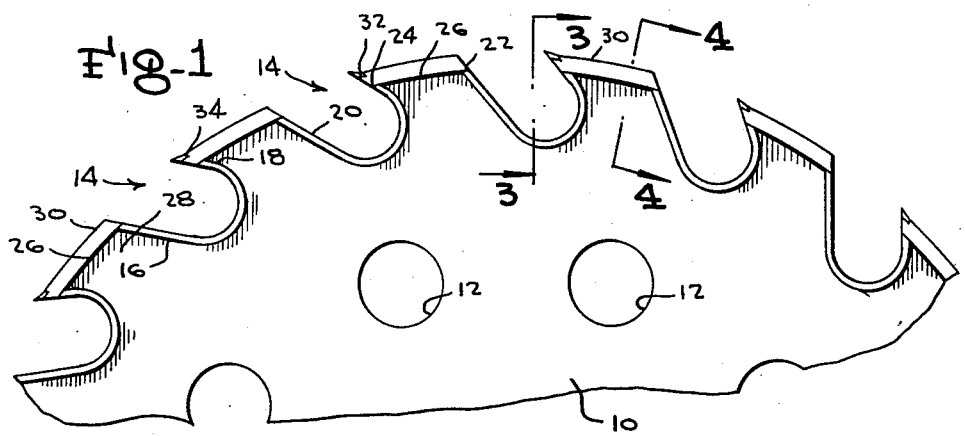
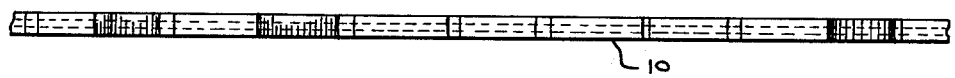
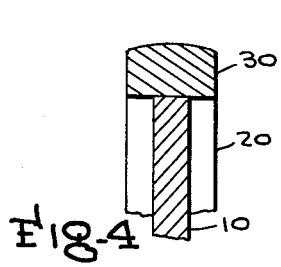
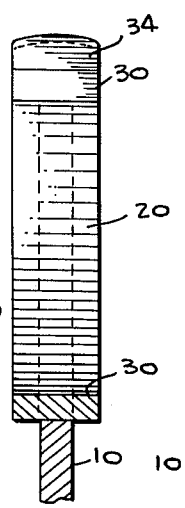
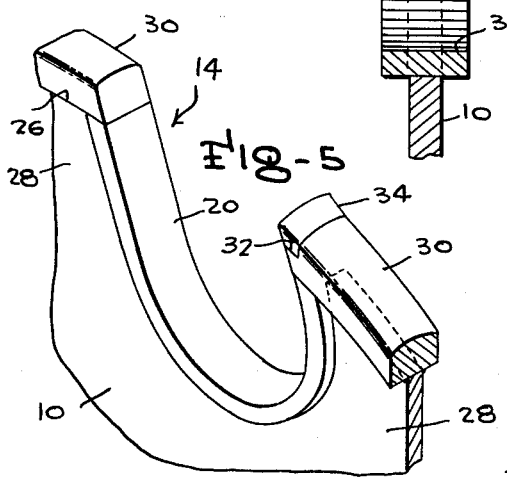
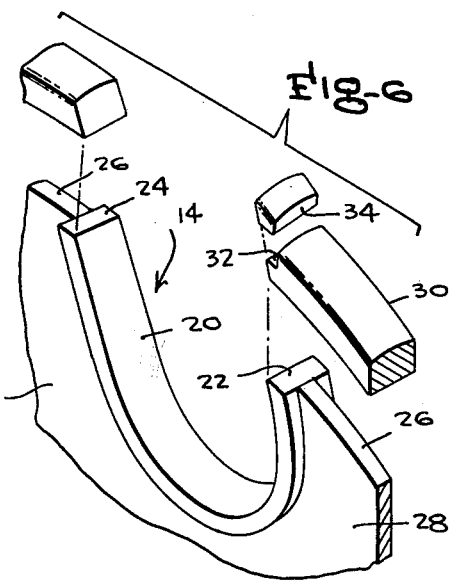
INVENTOR.
MILTON G. SPRAGUE
BY
McMorrow, Berman & Davidson
ATTORNEYS

United States Patent Office 3,133,533
Patented May 19, 1964

3,133,533
CIRCULAR SAW
Milton G. Sprague, 3507 Pickett Road, St. Joseph, Mo.
Filed Mar. 15, 1963, Ser. No. 265,476
8 Claims. (Cl. 125—15)

This invention relates to circular saw blades, and in particular to that class of saws used in cutting various materials other than wood and metal. Frozen earth, asphaltic concrete and rolled stone road base are typical examples of materials intended to be cut by the saw of the present invention, but its legitimate use may also be extended to numerous other materials, such as concrete, marble, tile, brick, slate, granite, onyx and other materials. Since the materials handled are derived directly or indirectly from the rock crust of the earth, the saw may be referred to, generically, as an "earth" saw.

It is an object of the invention to provide a saw blade of increased efficiency, by virtue of structure minimizing frictional contact with the work, by non-cutting portions of the blade. More particularly, it is an object to provide tooth-carrying flanges in sections, on the periphery of the blade, which extend on opposite sides of the blade, and carry a cutting tooth of minimal dimensions on their forward, upper corner.

A further object is to provide structure affording an improved chip-cleaning function, and more particularly, to provide a side-extending flange on the edge of the saw gullet. In still greater particular, it is an object to provide a flange on the gullet edge, comparable in width to the tooth-holding flange.

Other objects include the provision of a saw blade which, while possessed of the foregoing, enumerated advantages, is, additionally, relatively simple in structure and unitary of composition, and also easy of manufacture, and low in cost, and durable in use.

These and other objects, which will be apparent, are attained by the present invention, a preferred form of which is described in the following specification, as illustrated in the drawing, in which:

FIGURE 1 is a fragmentary view, in side elevation, of a portion of the novel blade, near its peripheral edge, FIGURE 2 is a top plan view of the blade fragment shown in FIGURE 1, FIGURE 3 is a sectional view, enlarged, of a detail through one of the several gullets, taken on the plane of the line 3—3 of FIGURE 1, FIGURE 4 is a sectional view, enlarged, of another detail, through the peripheral edge of the blade, taken on the plane of the line 4—4 of FIGURE 1, FIGURE 5 is a fragmentary view, in perspective, on enlarged scale, showing one complete gullet of the saw blade, and FIGURE 6 is a view similar to that of FIGURE 5, bracketed, and showing several of the component parts of the blade system in exploded form.

Referring to the drawing by characters of reference, there is shown a composite blade structure comprising a central disc 10, of a suitable grade of steel, as understood in the art, preferably having a symmetrical series of circular apertures 12, to reduce the weight of the blade in desired degree, and which will be provided with the usual, central aperture, for mounting on an arbor, which forms no part of the present invention, and which has not, therefore, been illustrated.

To provide for the serially toothed arrangement, peripherally of the saw blade, the latter is formed with equi-angularly spaced notches, or gullets, 14, of generally U-form, but inclined at a constant angle to a radius of the disc, so that the forward edge 16 of the two parallel edges of the gullet (FIGURE 1), is longer than the following edge 18, thereof.

Superimposed on the free edge of the gullet 14, is a ribbon-like, transverse, steel flange 20, secured as by welding, and extending equally on opposite sides of the disc 10, so as to constitute a structure which is T-form in cross section. As seen in FIGURE 6, the two end edges 22, 24 of the tines of flange 20 terminate at the circular line of the peripheral segments 26 of the tongues 28 between the gullets, and therefore form a slight continuation thereof. Overlying each peripheral segment 26 as well as the leading end edge 24 of a gullet flange 20 and the following end flange 22 of the next preceding gullet flange, is a flange section 30, extending equally on both sides of disc 10 in the same manner, and to the same extent as gullet flange 20. The peripheral flange 30, which is preferably domed, transversely, on its upper side, with rounded, outer edges, is rabbeted, transversely, on its upper, forward edge, as at 32, and in the notch thus formed is mounted a cutting tip 34, of suitable abrasive material, such as Carborundum, or bonded diamond dust, for instance. The cutting tip may have a domed top and rounded edges, to comport with its holder 30, but its upper side is inclined at an angle to the top surface of holder 30, so that the leading end of the tip lies above the outer periphery of holder 30, to provide a rake angle. The forward or leading face of the tool, as well as the forward face of holder 30 are formed as a continuation of the inner surface of the following tine of the gullet flange 20. Also, the trailing face of the tool holder 30 is formed at the same angle as, and in continuation of the forward tine of a gullet flange 20. The holder flanges 30 may be secured to disc 10 by welding, and the cutting tips 34 may be likewise secured to the holders 30.

The flanges 30 not only serve to accommodate a cutting tip of minimum, overall size, without sacrifice to efficiency, but also improve efficiency by stabilizing the disc system within the saw kerf, as against vibration, while minimizing frictional resistance. This stabilization is also assisted by gullet flanges 20, which, in addition, improve the cleaning functon by virtue of completely spanning the kerf.

While a certain, preferred embodiment has been shown and described, various modifications will be apparent, in the light of this disclosure, and the invention should not, therefore, be deemed as limited, except insofar as shall appear from the spirit and scope of the appended claims.

I claim:

1. A circular saw blade comprising a disc having a symmetrical series of apertures located internally of its periphery, and a series of notches in its periphery, of generally U form, oriented at a common angle to a radius of the disc, a first ribbon-like flange secured to the inner edge of each of said notches, perpendicular to said disc and extending equal distances on opposite sides thereof, the outer ends of said flanges terminating flush with the outer periphery of said disc, a second ribbon-like flange secured to said outer periphery between each adjacent pair of notches, extending equal distances on both sides of said disc, overlying the respective leading and following ends of adjacent tines of said first flange, and having ends arranged in continuation of the angles of said tines, said second flanges each having a transversely domed top, with rounded, upper edges, and each having a rabbeted, forward, upper corner notch, and a tool tip of abrasive material contained in each said corner notch, with a leading face in general continuation of the angle on the forward face of said second flange, and a cutting edge extending beyond the outer periphery of said disc.

2. A circular saw blade comprising a disc having a series of notches in its periphery, of generally U-form, oriented at a common angle to a radius of the disc, a first ribbon-like flange secured to the inner edge of each of said notches, perpendicular to said disc and extending equal distances on opposite sides thereof, the outer ends of said flanges terminating flush with the outer periphery of said disc, a second ribbon-like flange secured to said outer periphery between each adjacent pair of notches, extending equal distances on both sides of said disc, overlying the respective leading and following ends of adjacent tines of said first flange, and having ends arranged in continuation of the angles of said tines, said second flanges each having rounded, upper edges, and each having a rabbeted, forward, upper corner notch, and a tool tip of abrasive material contained in each said corner notch, with a leading face in general continuation of the angle on the forward face of said second flange, and a cutting edge extending beyond the outer periphery of said disc.

3. A circular saw blade comprising a disc having a series of notches in its periphery, of generally U-form, oriented at a common angle to a radius of the disc, a first ribbon-like flange secured to the inner edge of each of said notches, perpendicular to said disc and extending equal distances on opposite sides thereof, the outer ends of said flanges terminating flush with the outer periphery of said disc, a second ribbon-like flange secured to said outer periphery between each adjacent pair of notches, extending equal distances on both sides of said disc, overlying the respective leading and following ends of adjacent tines of said first flange, and having ends arranged in continuation of the angles of said tines, said second flanges each having a forward, upper corner notch, and a tool tip of abrasive material contained in each said corner notch, with a leading face in general continuation of the angle on the forward face of said second flange, and a cutting edge extending beyond the outer periphery of said disc.

4. A circular saw blade comprising a disc having a series of notches in its periphery, of generally U-form, oriented at a common angle to a radius of the disc, a first ribbon-like flange secured to the inner edge of each of said notches, the outer ends of said flanges terminating flush with the outer periphery of said disc, a second ribbon-like flange secured to said outer periphery between each adjacent pair of notches, overlying the respective leading and following ends of adjacent tines of said first flange, and having ends arranged in continuation of the angles of said tines, said second flanges each having a forward, upper corner notch, and a tool tip of abrasive material contained in each said corner notch, with a leading face in general continuation of the angle on the forward face of said second flange, and a cutting edge extending beyond the outer periphery of said disc.

5. A circular saw blade comprising a disc having a series of notches in its periphery, of generally U-form, oriented at a common angle to a radius of the disc, a first ribbon-like flange secured to the inner edge of each of said notches, a second ribbon-like flange secured to said outer periphery between each adjacent pair of notches, and having ends arranged in continuation of the angles of said tines, said second flanges each having a forward, upper corner notch, and a tool tip of abrasive material contained in each said corner notch, with a leading face angularly arranged in the sense of the angle on the forward face of said second flange, and a cutting edge extending beyond the outer periphery of said disc.

6. A circular saw blade comprising a disc having a series of notches in its periphery, of generally U-form, oriented at a common angle to a radius of the disc, a first ribbon-like flange secured to the inner edge of each of said notches, a second ribbon-like flange secured to said outer periphery between each adjacent pair of notches, and having ends angularly arranged in the general sense of the angles of said notches, said second flanges each having a forward, upper corner notch, and a tool tip of abrasive material contained in each said corner notch, with a leading face angularly arranged in the sense of the angle on the forward face of said second flange, and a cutting edge extending beyond the outer periphery of said disc.

7. A circular saw blade comprising a disc with peripheral notches arranged at a common angle to radii of the disc, a transverse flange on the edge of each notch and substantially coextensive therewith, a transverse flange on each of the sections of the peripheral edges of said disc between adjacent, said notches, a corner notch in the upper corner of the leading end of the second-mentioned flange, and a tool tip of abrasive material carried by said corner notch, and having a cutting edge extending beyond the peripheral edge of said disc.

8. A circular saw blade comprising a disc with peripheral notches arranged at a common angle to radii of the disc, a transverse flange on the edge of each notch and substantially coextensive therewith, a transverse flange on each of the sections of the peripheral edges of said disc between adjacent, said notches, a corner notch in the upper corner of the leading end of the second-mentioned flange, and a tool tip of abrasive material carried by said corner notch.

References Cited in the file of this patent

UNITED STATES PATENTS

| | | |
|---|---|---|
| 646,373 | Phillips | Mar. 27, 1900 |
| 1,837,344 | Stauder | Dec. 22, 1931 |
| 2,334,928 | Hollenbeck | Nov. 23, 1943 |
| 2,714,317 | Drake | Aug. 2, 1955 |

FOREIGN PATENTS

| | | |
|---|---|---|
| 328,187 | Germany | Oct. 25, 1920 |